United States Patent
Xiao et al.

(10) Patent No.: US 10,860,582 B2
(45) Date of Patent: Dec. 8, 2020

(54) RISKY BEHAVIOR QUERY CONSTRUCTION AND EXECUTION

(71) Applicant: NEC Laboratories America, Inc., Princeton, NJ (US)

(72) Inventors: Xusheng Xiao, Plainsboro, CA (US); Zhichun Li, Princeton, NJ (US); Fengyuan Xu, Franklin Park, NJ (US); Peng Gao, Princeton, NJ (US); Guofei Jiang, Princeton, NJ (US)

(73) Assignee: NEC CORPORATION

( * ) Notice: Subject to any disclaimer, the term of this patent is extended or adjusted under 35 U.S.C. 154(b) by 538 days.

(21) Appl. No.: 15/364,489

(22) Filed: Nov. 30, 2016

(65) Prior Publication Data

US 2017/0220639 A1    Aug. 3, 2017

Related U.S. Application Data

(60) Provisional application No. 62/288,676, filed on Jan. 29, 2016.

(51) Int. Cl.

| | |
|---|---|
| G06F 16/00 | (2019.01) |
| G06F 16/2453 | (2019.01) |
| G06F 16/2458 | (2019.01) |
| G06F 16/2455 | (2019.01) |
| G06F 21/00 | (2013.01) |
| G06F 21/55 | (2013.01) |
| G06F 16/245 | (2019.01) |
| G06F 16/242 | (2019.01) |

(52) U.S. Cl.
CPC ...... G06F 16/24545 (2019.01); G06F 16/242 (2019.01); G06F 16/245 (2019.01); G06F 16/2448 (2019.01); G06F 16/2477 (2019.01); G06F 16/24554 (2019.01); G06F 21/00 (2013.01); G06F 21/554 (2013.01)

(58) Field of Classification Search
CPC .......... G06F 16/24545; G06F 16/2448; G06F 16/242; G06F 16/245; G06F 16/2477; G06F 16/24554; G06F 11/30; G06F 21/00; G06F 21/554
See application file for complete search history.

(56) References Cited

U.S. PATENT DOCUMENTS

| | | | |
|---|---|---|---|
| 6,324,535 B1 * | 11/2001 | Bair | G06F 16/2477 707/769 |
| 8,065,319 B2 | 11/2011 | Ding et al. | |
| 9,438,618 B1 * | 9/2016 | Sultan | H04L 63/1433 |
| 2004/0117359 A1 * | 6/2004 | Snodgrass | G06F 16/2477 |

(Continued)

OTHER PUBLICATIONS

Google Search (Year: 2015).*

(Continued)

*Primary Examiner* — Mark D Featherstone
*Assistant Examiner* — Kweku William Halm
(74) *Attorney, Agent, or Firm* — Joseph Kolodka

(57) ABSTRACT

Systems and a method are provided. A system includes a Temporal Behavior Query Language (TBQL) server having a processor and a memory operably coupled to the processor. The TBQL server configured to construct a TBQL query using a grammar inference technique based on syntactic sugar to expedite query construction. The TBQL server is further configured to execute the TBQL query to generate TBQL query results.

18 Claims, 3 Drawing Sheets

(56) References Cited

U.S. PATENT DOCUMENTS

| | | | | |
|---|---|---|---|---|
| 2008/0120283 | A1* | 5/2008 | Liu | G06F 16/83 |
| 2015/0052441 | A1* | 2/2015 | Degioanni | G06F 3/0481 |
| | | | | 715/734 |
| 2016/0048565 | A1* | 2/2016 | Cammert | G06F 16/24568 |
| | | | | 707/776 |
| 2016/0283568 | A1* | 9/2016 | Praver | G06F 16/2477 |
| 2018/0183681 | A1* | 6/2018 | Chen | H04L 41/145 |

OTHER PUBLICATIONS

Wikipedia—Query Plan (Year: 2005).*
Liang Song et al., "Querying Process Models Based on the Temporal Relations Between Tasks" in 15th IEEE International Enterprise Distributed Ojbect Computing Conference Workshops (EDOCW), pp. 213-222, 2011, see pp. 213, 215-218 and 221; and figures 4-5.
Arasu, et al., "The CQL Continuous Query Language: Semantic Foundations and Query Execution", The VLDB Journal, Jun. 2006, pp. 1-44.
Bianco, et al.,"SyQL: an Object Oriented, Fuzzy, Temporal Query Language for Repositories of Software Artifacts", OOPSLA'08, Oct. 2008, pp. 715-716.
Barcelo, et al., "Expressive Languages for Path Queries over Graph-Structured Data", PODS'10, Jun. 2010, pp. 3-14.
Consens, et al., "Expressing Structural Hypertext Queries in Graphlog", Hypertext 89 Proceedings, Nov. 1989, pp. 269-292.
Cruz, et al., "A Graphical Query Language Supporting Recursion", ACM 1987, Dec. 1987, pp. 323-330.
Holzschuher, et al., "Performance of Graph Query Languages", Comparison of Cypher, Gremlin and Native Access in Neo4j, EDBT/ICDT '13, Mar. 2013, pp. 195-204.
Imamura, et al., "A Stream Query Language TPQL for Anomaly Detection in Facility Management", IDEAS '12, Aug. 2012, pp. 235-238.
Stearley, et al., "Bridging the Gaps: Joining Information Sources with Splunk", In Proceedings of the 2010 workshop on Managing Systems Via Log Analysis and Machine Learning Techniques, SLAML'10, Oct. 2010.
Tian, et al., "A Novel Neuron Data Model with Domain Specific Query Language", Proceedings of the 2005 IEEE Engineering in Medicine and Biology 27th Annual Conference, Sep. 2005, pp. 6068-6071.
Zong, et al., "Behavior Query Discovery in System Generated Temporal", ARXIV, Nov. 2015, pp. 2-16.

* cited by examiner

RISKY BEHAVIOR QUERY CONSTRUCTION AND EXECUTION

RELATED APPLICATION INFORMATION

This application claims priority to U.S. Provisional Pat. App. Ser. No. 62/288,676 filed on Jan. 29, 2016, incorporated herein by reference in its entirety.

BACKGROUND

Technical Field

The present invention relates to query languages and more particularly risky behavior query construction and execution.

Description of the Related Art

Today, it is difficult for system administrators to cope with vulnerabilities without monitoring and understanding system behaviors. Considering the massive scale and event-driven characteristics of the monitoring data, there lacks an effective query language for users to easily and efficiently query this data for security-related behaviors. Existing languages, such as Structured Query Language (SQL) and graph query languages, are either too verbose or not efficient for such tasks.

Currently, there is no effective tool specifically tailored to querying massive system event data for security-related behaviors. The most popular general purpose querying tool, SQL, has several drawbacks. First, SQL is verbose in expressing events. For example, if the user wants to query the event "Whether the process 'cat' opens the file '/etc/passwd' on a machine", SQL needs to explicitly specify three table names (i.e., file table, process table, file event table) and specify table join conditions. Second, SQL cannot handle time-windows effectively. For example, the user is not able to easily query results in a certain time period without calculating the UTC timestamps first and fill into SQL queries. Also, optimization opportunities related to time windows cannot be considered easily in the query execution engine. Third, SQL is cumbersome to specify multi-events and their temporal relationships. For example, "Process p1 open file f1 then after 10 minutes, process p1 open another file f2." In addition to SQL and relational database, graph database technologies face the indexing problem and are not scalable to large datasets.

Thus, there is a need for a query language that overcomes the aforementioned problems of the prior art.

SUMMARY

According to an aspect of the present invention, a system is provided. The system includes a Temporal Behavior Query Language (TBQL) server having a processor and a memory operably coupled to the processor. The TBQL server is configured to construct a TBQL query using a grammar inference technique based on syntactic sugar to expedite query construction. The TBQL server is further configured to execute the TBQL query to generate TBQL query results.

According to another aspect of the present invention, a computer-implemented method is provided. The method includes constructing, by a Temporal Behavior Query Language (TBQL) server having a processor and a memory operably coupled to the processor, a TBQL query using a grammar inference technique based on syntactic sugar to expedite query construction. The method further includes executing, by the TBQL server, the TBQL query to generate TBQL query results.

According to yet another aspect of the present invention, a system is provided. The system includes a Temporal Behavior Query Language (TBQL) server having a processor and a memory operably coupled to the processor. The TBQL server is configured to construct a TBQL query based on user input. The TBQL server is further configured to execute the TBL query using at least one data partitioning technique that partitions query related data based on at least one of an involved time and an involved agent.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
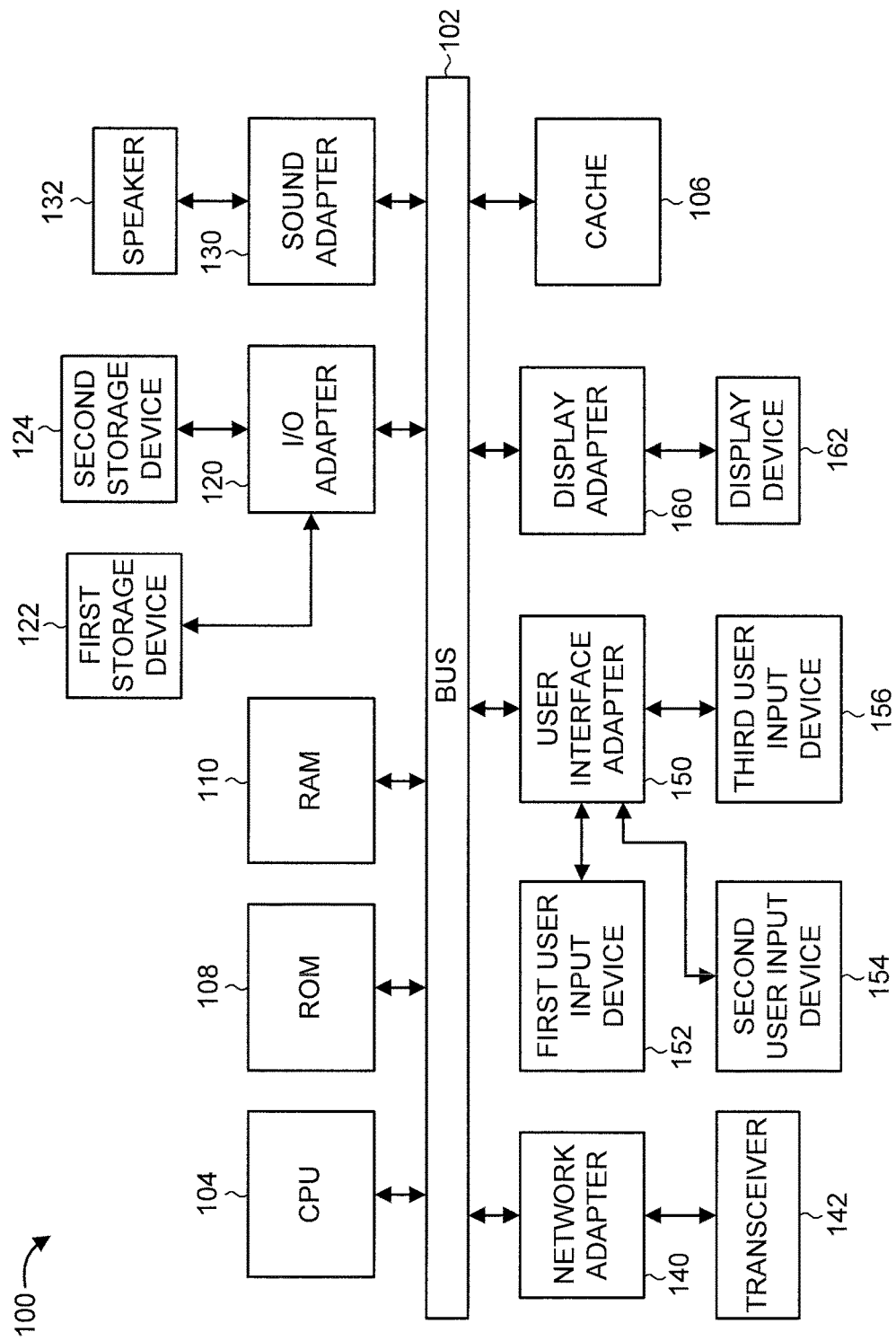
FIG. 1 shows a block diagram of an exemplary processing system 100 to which the present invention may be applied, in accordance with an embodiment of the present invention.

The present invention is directed to risky behavior query construction and execution.

In an embodiment, TBQL is proposed as a domain-specific language for querying risky behaviors among massive system event data. TBQL is able to query single-events (e.g., reading of an item (e.g., a password, etc.), process listening on port 80, user history probing, etc.), multi-events (i.e., a combination of multiple single-events with event relationship constraints), subqueries (results of a multi-event query are used as attribute constraints of another multi-event query), and causal dependencies (information flow of system events, e.g., process p1 writes to file f1, and then process p2 reads from the file f1). Moreover, TBQL has lots of built-in syntactic sugar to make the typing even simpler.

TBQL adopts the syntax format of {subject-operation-object} to specify event patterns, where system entities are represented as subjects and objects, and interactions among system entities are represented as operations initiated by subjects and targeted on objects. An example event pattern expressed using, TBQL is Q1: {proc p1 write file f1}. This syntax is quite user-friendly, since it is inspired by the subject-verb-object (SVO) sentence structure, which is the most commonly used sentence structure in terms of the number of speakers. To ease the task of specifying relationships among events, TBQL provides a syntax to directly support the following two major types of relationships: attribute relationship; and temporal relationship. An attribute relationship allows users to use an event's attributes to constrain the search of another event. For example, in the query Q1, the user may further specify {with p1.exe_name='% chrome.exe'}, which means the process p1 should have a name ending with "chrome.exe", which is the name of the Google Chrome browser. The temporal relationship allows users to use an event's temporal information to constrain the search of another event. For example, in the query Q2: {proc p1 write file f1 as evt1 proc p2 read file f1 as evt2}, the user may specify {with evt1 before evt2}, which means the event where the process p1 writes to the file f1 should occur before the event where the process p2 reads from the file f1.

To allow users to easily reconstruct causal dependencies between historical events, TBQL provides a path syntax that expresses event paths in the temporal graph of system monitoring data. For example, the query Q3: {backward: file f1[% chrome.exe] <-[write]proc p1->[execute] file f2} will first search for the events matched by the first event pattern {file f1["% chrome.exe"] <-[write] proc p1} and then search backward in time for the events matched by the second event pattern {proc p1->[execute] file f2}. In the query, the direction of each arrow points from the subject to the object of the event pattern, and the keyword backward indicates the events found by the second event pattern should occur before the events found by the first event pattern. The keyword forward can be used to track dependencies between events forward in time. To track dependencies of events across hosts, the operation {->[connect]} should be used. For example, the query {proc p1['% apache %', agentid=1] ->[connect] proc p2[agentid=2]} searches for the network events where the process apache at the host with id 1 sends data to the process p2 at the host with id 2. The temporal order of the events at the same host is enforced strictly based on the sequence number assigned by the deployed agents, while the temporal order of the events at different hosts is adjusted based on the network events matched between the hosts.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
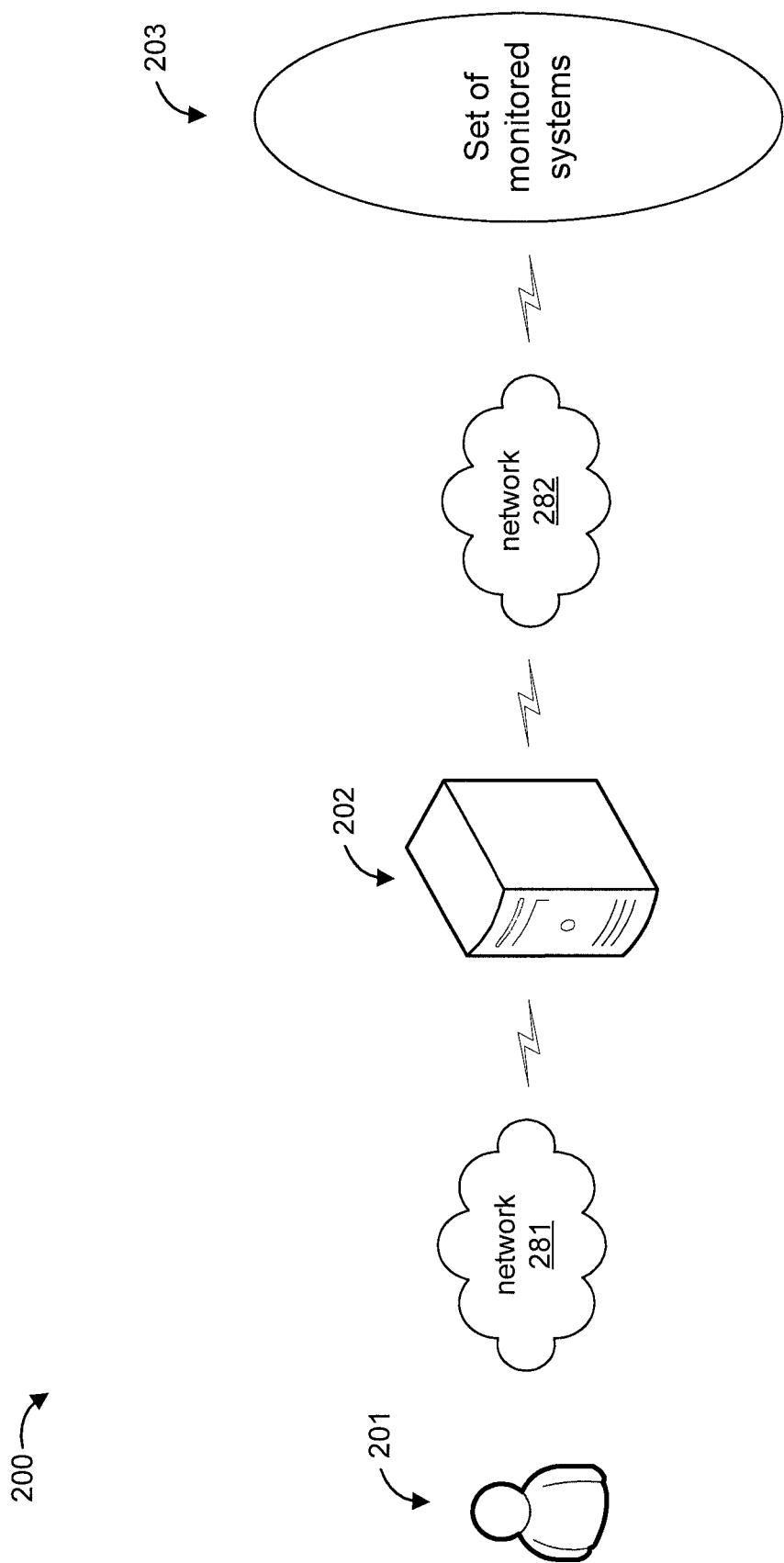
FIG. 2 shows a block diagram of an exemplary environment 200 to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
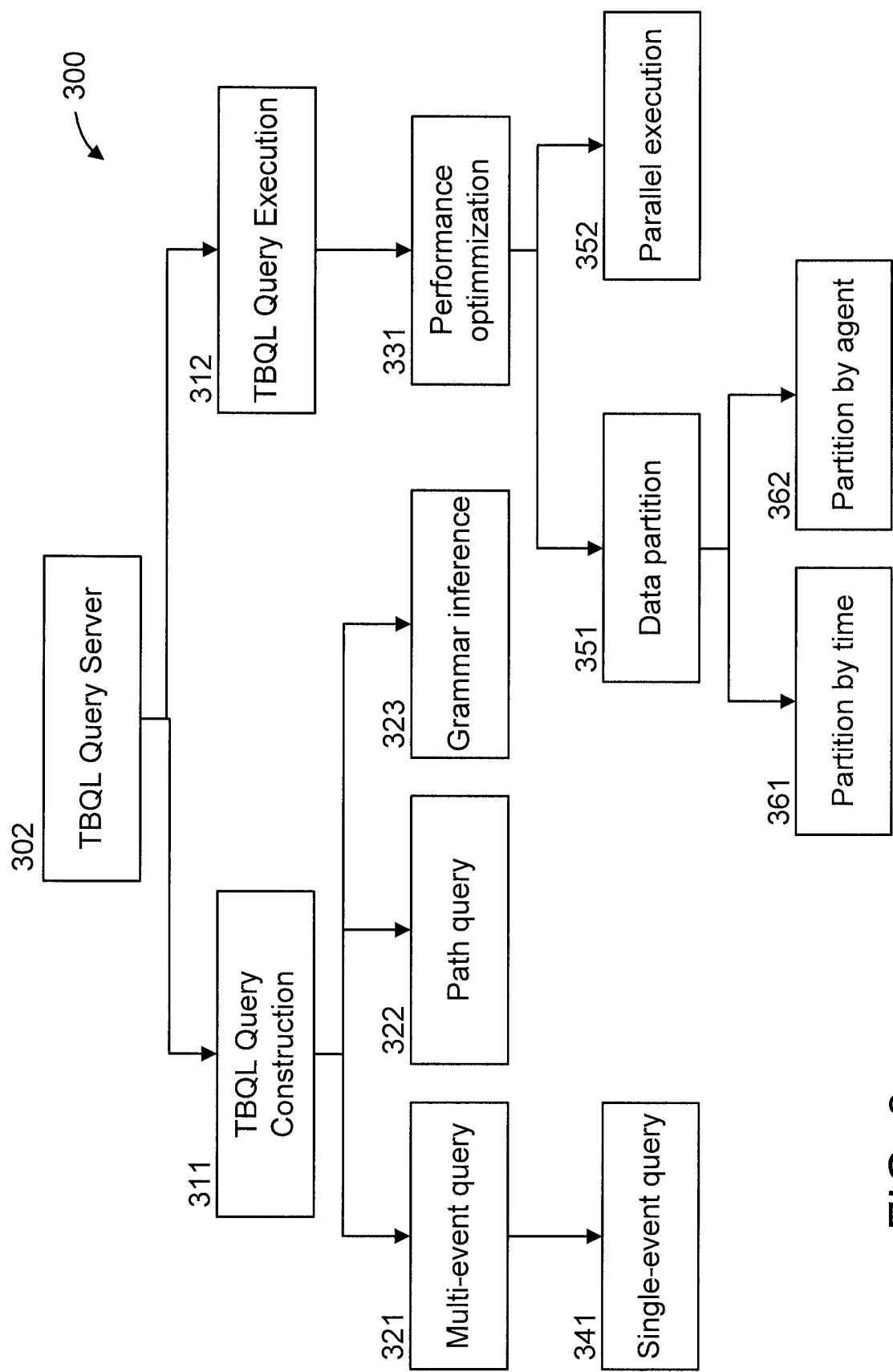
FIG. 3 shows a high-level block/flow diagram of an exemplary system/method 300 for risky behavior query construction and execution, in accordance with an embodiment of the present invention.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows a block diagram of an exemplary environment 200 to which the present invention can be applied, in accordance with an embodiment of the present invention.

The environment 200 includes a user 201, a TBQL query server 202, and a set of monitored systems 203.

Communication between the user 201, the TBQL query server 202, and the set of monitored systems 203 can occur over one or more networks. For the sake of illustration, communications between the user 201 and the TBQL server 202 occur over a set of networks 281, and communications between the TBQL server 202 and the set of monitored systems 203 occur over a set of networks 282. It is to be appreciated that the sets of networks 281 and 282 can include and/or involve any type of network(s) as readily appreciated by one of ordinary skill in the art given the teachings of the present invention provided herein, while maintaining the spirit of the present invention.

The TBQL server 202 is configured to construct or assisting in constructing TBQL queries based on input from the user 201. For example, as the user types in order to form a TBQL query, the TBQL server 202 can complete some of the typing started by the user, and/or providing likely suggestions for the next letter or words or related concepts and/or providing likely suggestions for the queries themselves that the user can select for execution with respect to a particular behavior(s) of interest. For example, in an embodiment, the TBQL server 202 can suggest a set of TBQL queries responsive to one or more user inputs "hinting" at the parameters/objects of interest to the user 201 related to behaviors such as risky behaviors occurring in the set of monitored systems 203. Thus, as used herein with respect to query construction by the TBQL server 202, the term "construct" can refer to the TBQL server 202 assisting the user 201 in constructing a TBQL query or can refer to the TBQL server 202 and the user 201 cooperatively constructing the TBQL query.

In an embodiment, in suggesting TBQL queries to the user 201, the TBQL server 202 can use probability-based techniques to determine a set of likely (probable) TBQL queries of interest to the user. In an embodiment, in suggesting TBQL queries to the user 201, the TBQL server 202 can use history information, such as history information relating to prior queries, and/or prior users, and/or so forth. These and other basis for suggesting TBQL queries are readily contemplated by one of ordinary skill in the art, given the teachings of the present invention provided herein, while maintaining the spirit of the present invention.

In an embodiment, the number of TBQL queries suggested to the user can be constrained to a particular number based on user input.

The TBQL queries can be and/or otherwise involve multi-event queries, single event queries, path queries, and so forth.

In an embodiment, the TBQL server 202 can use grammar inference to make it easier for the user to type in TBQL queries. In an embodiment, the TBQL server 202 can use syntactic sugar to make it easier for the user to type in TBQL queries. In an embodiment, the grammar inference can use the syntactic sugar.

In an embodiment, the TBQL server 202 can employ performance optimizations. The performance optimizations can include, but are not limited to, data partitioning and parallel execution. In an embodiment, the data partitioning and parallel execution can be implemented with respect to a temporal system events domain that efficiently executes the query and produces query results.

Regarding data partitioning the same can involve partitioning query related data (e.g., query execution related data) by time and/or by agent.

For example, regarding partitioning time, the query can be partitioned by involved times relating to data dependency, such as when a part of a query must be completed before another part of the query, and so forth. As a further example regarding partitioning by time, parts of a query relating to different (multi) temporal events can be partitioned based on the timing of the respective occurrences of the temporal events. These and other time partitioning basis are readily determined by one of ordinary skill in the art given the teachings of the present invention provided herein, while maintaining the spirit of the present invention.

Regarding partitioning by agent, the same can involve, for example, partitioning based which agent from a set of possible agents collected and/or monitored and/or sent information relating to a query, and/or so forth.

Regarding parallel execution, in one example relating to the same, separate portions of a query (e.g., related to separate events, separate databases to be accessed, and so forth) can be executed in parallel, depending upon the data dependencies implicated by the query.

The set of monitored systems 203 can include any type of system for which monitoring is desired. In an embodiment, the systems 203 in the set are monitored for risky behaviors. As is evident to one of ordinary skill in the art, the parameters being monitored depend upon the particular implementation including, for example, but not limited to, the types of systems being monitored, the type of data being monitored, and so forth. The TBQL queries can include multi-event or single-event queries directed to such monitored systems 203 including, for example, risky behaviors relating to such monitored systems.

In an embodiment, the TBQL queries are directed to security-related behaviors. The security-related behaviors can, in turn, relate to, for example, but are not limited to, processes, files, sockets, and so forth. Moreover, the security related behaviors can, in turn, relate to, actions performed with respect to certain entities of the set of monitored systems 203. Thus, for example, the TBQL queries can relate to actions such as, for example, but not limited to, open, close, read, write, and so forth. The preceding types of behaviors and examples thereof are merely illustrative. As readily appreciated by one of ordinary skill in the art, the present invention can be configured to monitor any type of behavior and any related action.

In an embodiment, the monitored behaviors can be in the form of traces of how system entities (e.g., processes, files, and sockets) interact with each other at the operating system level. In an embodiment, the monitoring data can be a series of system events, with the subject and object being system entities and operation being the type of action (e.g., open, close, read, write) that the subject performs on the object. In an embodiment, the monitoring data is essentially a heterogeneous temporal graph with nodes being system entities and edges being their interactions with timestamps.

FIG. 3 shows a high-level block/flow diagram of an exemplary system/method 300 for risky behavior query construction and execution, in accordance with an embodiment of the present invention. The system 300 can be considered as a querying system".

In block 302, provide a TBQL server. Blocks 311 and 312 are directly subordinate to block 302 in the implied hierarchy 399 of operations depicted in FIG. 3.

In block 311, perform a TBQL query construction. The TBQL query can be constructed to be directed to risky behaviors. For example, risky behaviors to which the TBQL query can be directed include, but are not limited to: not employing certain security measures or protocols (e.g., operating without a validated and/or otherwise unknown certificate), and so forth. Blocks 321, 322, and 323 are directly subordinate to block 311 in the hierarchy 399.

In block 321, perform a multi-event query. Block 341 is directly subordinate to block 321 in the hierarchy 399.

In block 322, perform a path query.

In block 323, perform a grammar inference.

In block 341, perform a single-event query.

In block 312, perform a TBQL query execution. Block 331 is directly subordinate to block 312 in the hierarchy 399.

In block 331, perform an optimization. Blocks 351 and 352 are directly subordinate to block 331 in the hierarchy 399.

In block 351, perform a data partition operation. Blocks 361 and 362 are directly subordinate to block 351 in the hierarchy 399.

In block 352, perform a parallel execution.

In block 361, perform the data partition operation by time.

In block 362, perform the data partition operation by agent.

In describing the relationships between the blocks in the hierarchy 399 of FIG. 3, the term "directly subordinate" refers to one or more blocks that have operations that are part of the block to which it is directly subordinate to. Thus, for example, blocks 361 and 362, related to data partitioning by time and by agent, respectively, are two exemplary ways in which the data partition 351 (that blocks 361 and 362 are directly subordinate to) can be performed.

The querying system 300 includes and/or otherwise involves TBQL query construction 311 and query execution 312. The querying system 300 supports multi-event queries 321 (including single-event such as 'cat/etc/passwd') as well as path queries 322 (e.g., process p2 start process p1 then open file f1). A multi-event query can be used as a subquery within another multi-event query. In TBQL query execution 312, an efficient and intelligent query planer/executor is provided that optimizes the execution based on a user's input. The grammar inference 331 is used in conjunction with syntax sugars to make the query typing concise and efficient. The data partition 351 and parallel execution 352 are specifically designed for the temporal system events domain that efficiently executes the query and produces results.

A description will now b given regarding competitive and/or commercial advantages provided by the present invention. For example, no previous competitive solution is specialized for querying risky behaviors among massive system event data. Compared to general query languages like SQL and Cypher. TBQL has several competitive properties including but not limited to: (1) concise; (2) expressive; (3) intuitive; and (4) efficient. Regarding the property of being concise, TBQL requires users to do less typing to query complex behaviors. Regarding the property of being expressive, TBQL is powerful for specifying security-related behaviors, including single-event, multi-events, and abnormal events. Regarding the property of being intuitive, TBQL describes events directly in the form of subject operation-object and is straightforward to write. Regarding the property of being efficient, TBQL is a domain-specific language tailored to system events directly and equipped with an optimized query execution engine that is scalable to massive data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable far storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/input or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system, comprising:
   a Temporal Behavior Query Language (TBQL) server having a processor and a memory operably coupled to the processor, the TBQL server configured for:
   constructing a TBQL query using a grammar inference technique based on syntactic sugar to expedite query construction, the constructing comprising utilizing a syntax configured for directly specifying relationships between two or more events, the relationships including an attribute relationship configured for utilizing attributes of a first event to constrain a search of another event, and a temporal relationship configured for utilizing temporal information of the first event to constrain the search of the another event;

executing the TBQL query to generate TBQL query results; and tracking dependencies between the two or more events over time for a plurality of hosts, with a temporal order of events at a same host being strictly enforced based on a sequence number assigned to one or more deployed agents from among a plurality of agents, and a temporal order of the events at different hosts being adjusted based on network events matched between the different hosts, wherein the TBQL server is configured to execute the TBQL query using a data partitioning performance optimization that comprises partitioning query related data based on an involved agent from among the plurality of agents.

2. The system of claim 1, wherein the TBQL server constructs the TBQL query by selectively constructing at least one of a multi-event query and a path query.

3. The system of claim 2, wherein the multi-event query is used as a sub-query for another multi-event query.

4. The system of claim 2, wherein the multi-event query is formed from one or more single-event queries.

5. The system of claim 1, wherein the data partitioning performance optimization comprises partitioning query related data based on an involved time.

6. The system of claim 1, wherein the TBQL server constructs the TBQL queries relating to a set of monitored systems.

7. The system of claim 6, wherein the at least some of the TBQL queries are directed to risky behaviors relating to the set of monitored systems.

8. A computer-implemented method, comprising:

constructing, by a Temporal Behavior Query Language (TBQL) server having a processor and a memory operably coupled to the processor, a TBQL query using a grammar inference technique based on syntactic sugar to expedite query construction, the constructing comprising utilizing a syntax configured for directly specifying relationships between two or more events, the relationships including an attribute relationship configured for utilizing attributes of a first event to constrain a search of another event, and a temporal relationship configured for utilizing temporal information of the first event to constrain the search of the another event;

executing, by the TBQL server, the TBQL query to generate TBQL query results; and tracking, by the TBQL server, dependencies between the two or more events over time for a plurality of hosts, with a temporal order of events at a same host being strictly enforced based on a sequence number assigned to one or more deployed agents from among a plurality of agents, and a temporal order of the events at different hosts being adjusted based on network events matched between the different hosts, wherein the TBQL server is configured to execute the TBQL query using a data partitioning performance optimization that comprises partitioning query related data based on an involved agent from among the plurality of agents.

9. The computer-implemented method of claim 8, wherein the TBQL query is constructed by selectively constructing at least one of a multi-event query and a path query.

10. The computer-implemented method of claim 9, wherein the multi-event query is used as a sub-query for another multi-event query.

11. The computer-implemented method of claim 9, wherein the multi-event query is formed from one or more single-event queries.

12. The computer-implemented method of claim 8, wherein the TBQL query is executed using a data partitioning performance optimization.

13. The computer-implemented method of claim 12, wherein the data partitioning performance optimization comprises partitioning query related data based on an involved time.

14. The computer-implemented method of claim 12, wherein the data partitioning performance optimization comprises partitioning query related data based on an involved agent.

15. The computer-implemented method of claim 8, wherein the TBQL queries are constructed to relate to a set of monitored systems.

16. The computer-implemented method of claim 15, wherein the at least some of the TBQL queries are directed to risky behaviors relating to the set of monitored systems.

17. A system, comprising:

a Temporal Behavior Query Language (TBQL) server having a processor and a memory operably coupled to the processor, the TBQL server configured for:

constructing a TBQL query based on user input using a grammar inference technique based on syntactic sugar to expedite query construction, the constructing comprising utilizing a syntax configured for directly specifying relationships between two or more events, the relationships including an attribute relationship configured for utilizing attributes of a first event to constrain a search of another event, and a temporal relationship configured for utilizing temporal information of the first event to constrain the search of the another event;

tracking dependencies between the two or more events over time for a plurality of hosts, with a temporal order of events at a same host being strictly enforced based on a sequence number assigned to one or more deployed agents from among a plurality of agents, and a temporal order of the events at different hosts being adjusted based on network events matched between the different hosts, and executing the TBQL query using at least one data partitioning technique that partitions query related data based on an involved time and an involved agent from among the plurality of agents.

18. The system of claim 17, wherein the TBQL server constructs the TBQL query by selectively constructing at least one of a multi-event query and a path query.

* * * * *